Inventor
CLARENCE JOHNSON
By Raymond D. Junkins
Attorney

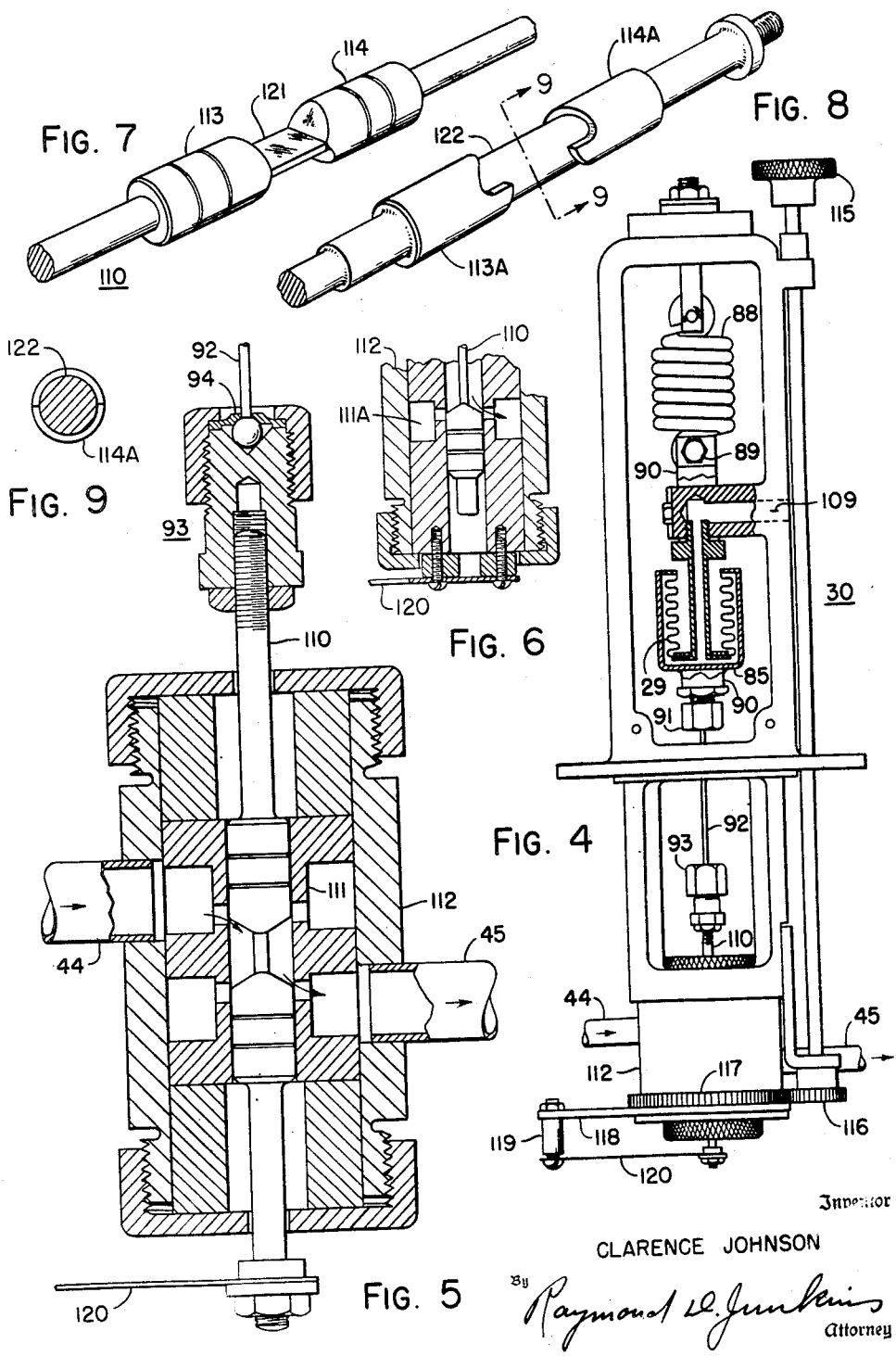
Jan. 6, 1953 — C. JOHNSON — 2,624,540
TOOL CONTROLLING FLUID VALVE
Original Filed March 2, 1944 — 2 SHEETS—SHEET 1
Inventor
CLARENCE JOHNSON Jan. 6, 1953  C. JOHNSON  2,624,540
TOOL CONTROLLING FLUID VALVE
Original Filed March 2, 1944  2 SHEETS—SHEET 2

Patented Jan. 6, 1953

2,624,540

UNITED STATES PATENT OFFICE 2,624,540

TOOL CONTROLLING FLUID VALVE

Clarence Johnson, Orfordville, Wis., assignor to Bailey Meter Company, a corporation of Delaware Original application March 2, 1944, Serial No. 524,707, now Patent No. 2,475,326, dated July 5, 1949. Divided and this application September 3, 1948, Serial No. 47,615

5 Claims. (Cl. 251—4)

This invention relates to duplicators for controlling the operation of a material forming machine so that a work piece is formed to a contour or configuration determined by a template, pattern or cam.

One of the objects of my invention is to improve the sensitivity of contour control of the type described and to thereby increase the accuracy with which the work piece is formed.

A further object of my invention is to provide a contour control of materially simpler construction than those now available.

In accordance with my invention the template or cam for producing the desired configuration on the work piece is scanned by a tracer regulating a jet of fluid from a nozzle. Variations in the shape of the template cause corresponding changes in the fluid discharged from the nozzle which variations are then used to control the relative positioning of the tool and work piece.

Further, in accordance with my invention the changes in fluid pressure control the relative positioning of the tool and work piece through a hydraulic relay and servo-motor, to the end that ample power is available for accurately positioning the tool relative to the work piece, or vice versa. The relative rates of movement of the tool and work piece in two or more directions are simultaneously controlled so that the rate of cutting feed of the tool remains substantially constant regardless of changes in contour or profile of the template, pattern or cam.

Certain structures and apparatus disclosed herein are claimed as my invention. Other features and apparatus, disclosed but not claimed herein, are disclosed and claimed in the copending application Serial No. 524,705 of Frederick A. Barnes filed March 2, 1944, now Patent 2,486,097 of October 25, 1949, and having the same assignee. This application constitutes a division of my copending application Serial No. 524,707 filed March 2, 1944, now Patent 2,475,326 of July 5, 1949.

Obviously a duplicator or contour control of the type forming the subject matter of my invention may be employed with material forming machines or machine tools of various types, such as milling machines, lathes, slotters, planers, die sinking machines and other machines in which the relative feed between the tool and work may be suitably controlled. By way of example I illustrate and will describe my invention as applied to metal working lathes. Further applications and modifications of my invention will be readily apparent.

In the drawings:

Fig. 4 is a front elevation, partly in section, of a fluid resistance assembly of Fig. 2.

Fig. 5 is an enlarged sectional elevation of the fluid resistance of Fig. 4.

Fig. 6 is a modification of Fig. 5.

Fig. 7 is an isometric view of the movable element of the fluid resistance of Fig. 5.

Fig. 8 is an isometric view of a modification of Fig. 7.

Fig. 9 is a sectional view in the direction of the arrows along the line 9—9 of Fig. 8.

As is well understood by those familiar with the art, in some machine tools such as lathes, the tool is moved longitudinally and transversely of the work piece which, except for rotation about its center, remains stationary. In other machine tools, such as some types of milling machines, the work piece may be moved in two directions, while the tool, except for rotation about its axis, remains stationary. In some other types of milling machines, and usually in die sinking machines, the tool may be moved in one or more directions and the work piece may also be moved in one or more directions. In all instances it will be observed, however, that it is the relative movement between the tool and work piece that causes the work piece to be formed to a desired shape. As one specific embodiment I have chosen to illustrate and describe my invention incorporated in a lathe wherein the work piece, except for rotation about its center, remains stationary and the tool is moved transversely and longitudinally thereof. It will be evident that my invention is applicable to a wide variety of machine tools, and that when I speak of relative movement between the tool and work piece I include either an arrangement where the tool is stationary and the work piece is moved, or where the work piece is stationary and the tool is moved, or a combination of the two.

Figure 1:
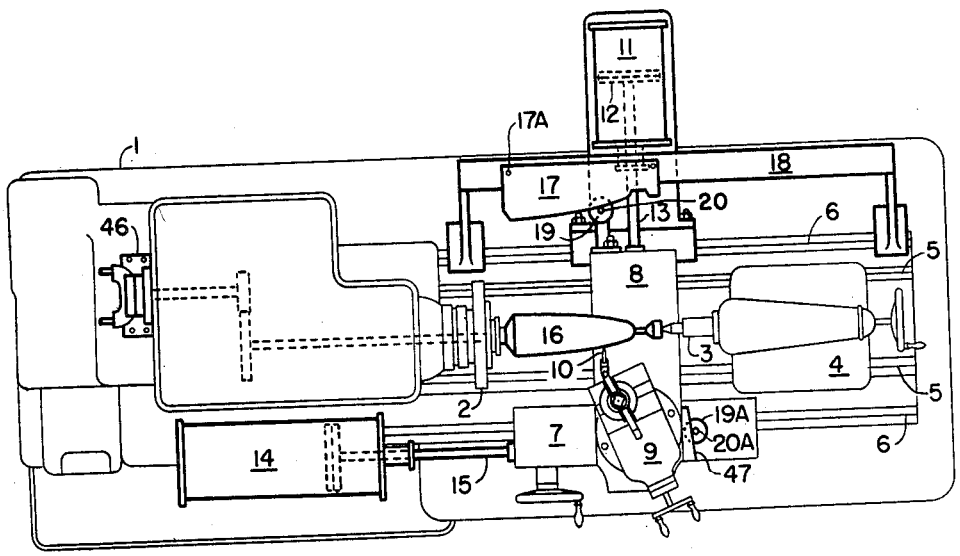
Fig. 1 is a plan view of an engine lathe illustrating the application of my invention thereto.

Referring now to Fig. 1, I show my invention applied to an engine lathe 1 having a head stock 2 adapted to be rotated by any suitable means. The carriage 4 is movable longitudinally along the bed of the lathe in suitable ways 5 and supports the tail stock 3. Also movable longitudinally along the bed of the lathe in suitable ways 6 is a carriage 7 upon which is mounted a cross-slide 8 movable on ways transversely of the bed of the lathe.

The cross-slide 8 is provided with an adjustable tool support 9 in which is secured a tool 10. Transverse movements of the tool 10 are produced through the agency of a hydraulic cylinder 11 having a piston 12 adapted to position the cross-slide 8 through the agency of a piston rod 13. Longitudinal movements of the tool 10, that is movements of the tool parallel to the bed of the lathe in a longitudinal direction, are produced by means of a hydraulic cylinder 14 having an operating piston rod 15.

Supported by the head stock 2 and the tail stock 3 is a work piece 16 which, for illustrative purposes, is shown as being formed to a parabolic shape by the tool 10. This particular shape has no significance, it being apparent as the description proceeds that by my invention the work piece may be formed automatically to any desired contour. The master template or cam 17 is rigidly held in parallelism to the work piece 16 upon any convenient extension 18 of the lathe bed. The profile of the master template 17 is the contour which it is desired to reproduce upon the work piece 16. In Fig. 1 the shape of the work piece 16 follows in general a parabolic function merely as an example. For contacting and following the profile of the master template 17 I provide a tracer assembly 19 rigidly mounted on and movable with the cross-slide 8. The tracer assembly 19 is shown in larger and more detailed fashion in my above mentioned Patent No. 2,475,326 as having a vertical extension 20 adapted to contact the front edge or profile of the master template 17. A body member or housing is adjustably mounted to the cross-slide 8 and the tracer extension or arm 20 is carried with the body.

The tracer arm 20 continually scans the profile of the template 17 and controls the bleed to atmosphere of a substantially constant pressure supply of compressed air. The variable bleed or rate of flow of air to the atmosphere produces corresponding changes in back pressure or pressure of the air effective to cause a positioning of the piston rods 13 and 15 for transverse and longitudinal movements respectively of the tool 10.

Figure 2:
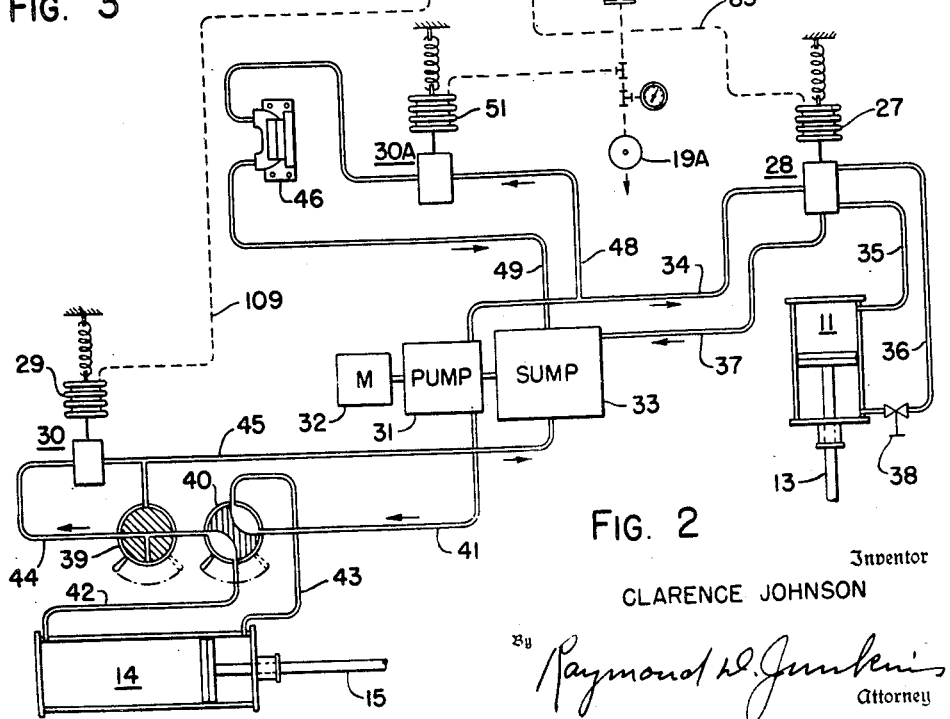
Fig. 2 is a diagrammatic illustration of the pneumatic and hydraulic control circuits employed in the embodiment of my invention shown in Fig. 1.

In Fig. 2 I have shown diagrammatically the pneumatic and hydraulic circuits for controlling the servomotors 11 and 14 by the tracer 19 in such manner that the motor 11 will position the cross-slide and consequently the tool 10 transversely of the lathe, or in other words toward or away from the work piece 16 as the tool is traveling longitudinally. The action is such that if the contacted edge of the master template 17 is a straight line parallel to the axis of the work piece 16, then the work piece 16 would be turned to cylindrical form. If the contacted edge of the template 17 is a straight line, but inclined relative to the axis of the work piece 16, then the work piece 16 will be shaped to a taper. The particular showing of Fig. 1 is in general a parabolic curve on the contacted edge of the template 17, and thus the form which is to be produced on the work piece 16.

Air under pressure from any convenient source is passed through a pressure regulator 22 and volume chamber 23 to a header 24, from which a branch 25 leads through an orifice 26 to the tracer assembly 19. As the discharge from the tracer 19 to the atmosphere varies, the pressure in the branch 25 between the orifice 26 and the tracer assembly 19 will vary, and such controlled air pressure, representative of changes in contour of the template 17, is effective upon a bellows 27 of a pilot valve assembly 28 and simultaneously upon a bellows 29 of a fluid resistance assembly 30. The pilot valve assembly 28 is explained in my Patent 2,526,361 while the fluid resistance 30 will be explained more in detail in connection with Figs. 4–9 inclusive herein.

I show an oil pump 31 driven by a motor 32 and drawing its supply of oil from a sump 33. Oil under pressure is supplied the pilot valve 28 by the pump 31 through a pipe 34. From the pilot valve 28 oil is supplied to one end or the other of the hydraulic motor 11 through the pipes 35 or 36. Drainage from the pilot 28 is returned to the sump 33 through a pipe 37. In the pipe 36 I show a hand adjustable valve 38 for variably throttling the flow of oil therethrough and thus controlling the basic rate of travel of the piston rod 13. Within any preselected range of speed of piston travel the relay of the assembly 28 not only controls the direction of piston travel but the speed within said range.

In connection with the hydraulic motor 14 and adjustable fluid resistance assembly 30 I provide switching valves 39 and 40 arranged to be moved together to either a "normal" or a "rapid traverse" position of operation of the hydraulic motor 14. The valves 39 and 40 are shown in Fig. 2 in the "normal" operating position. Oil under pressure from the pump 31 is forced through a pipe 41, the valve 40 and a pipe 43 to one end of the hydraulic motor 14. Oil from the other end of the motor passes through a pipe 42, the valve 40, the valve 39, the pipe 44, the adjustable fluid resistance 30, and the pipe 45 to the sump 33. The regulation of the variable resistance 30 determines the rate of flow of oil through the pipe 42, and consequently the rate of travel of the piston rod 15 toward the left in the drawing. Thus the rate of longitudinal travel of the tool 10 along the work piece is controlled by the variable resistance 30 to passage of oil therethrough from the left-hand end of the motor 14.

Figure 3:
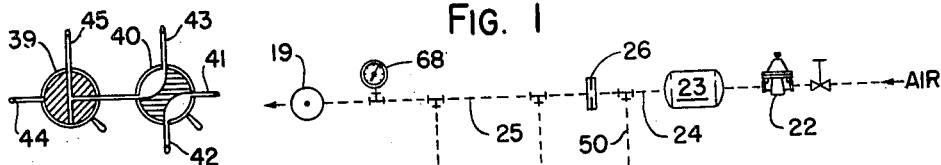
Fig. 3 is a transfer valve arrangement of Fig. 2.

In Fig. 3 I show a passage relation of the switching valves 39, 40 for a "rapid return" of the piston rod 15 from left to right of Fig. 2. That is for a rapid return of the tool 10 to the beginning of its working travel. Oil from the pump 31 passes directly through the pipe 41, the valve 40, and the pipe 42; while oil from the right-hand end of the motor 14 passes directly through the pipe 43, the valve 40, the valve 39, to the pipe 45 and sump 33. Thus on the rapid return of the piston rod 15 there is no throttling of its speed of travel by the variable resistance 30, and thus the tool is traversed to the right at maximum speed.

In general, the operation of the system illustrated in Figs. 1, 2 and 3 is as follows. The air pressure established within the pipe 25 is such that the bellows 27 and 29 (and the movable parts of the assemblies 28, 30 positioned thereby) provide a normal condition of operation. The pilot valve assembly 28 locks oil from the pipes 35, 36 so that the piston rod 13 is not moving and the tool 10 travels a cutting path parallel to the axis of the work piece 16. At the same time the variable fluid resistance 30 is in a position to provide a normal speed of travel of the piston rod 15 from right to left on the drawing, thus moving the tool 10 along the work at a uniform normal speed.

If the profile of the template 17 recedes from the axis of the work piece, or advances toward the axis of the work piece, the air pressure within the pipe 25 is correspondingly varied in proper direction to increase or decrease the air pressure within the bellows 27 and 29 and to cause a corresponding positioning of the movable elements of the pilot valve 28 and fluid resistance 30. Such movement causes the hydraulic motor 11 to position the tool toward or away from the axis of the work piece 16, and thus reproduce upon the work piece 16 the contour of the master template 17. At the same time any departure (in either direction) of the movable element of the variable resistance 30 from normal position will increase the resistance to oil passage therethrough and tend to slow up travel of the piston rod 15. Thus longitudinal travel of the tool 10 from right to left on the drawing will be at a speed slower than the normal speed depending upon the rate of travel of the tool 10 toward or away from the axis of the work piece 16. If, for example, the profile of the template 17 includes a shoulder at right angles to parallelism with the axis of the work piece 16, then there will be a complete stoppage of longitudinal travel of the tool 10 while the tool is advancing directly toward the axis of the work piece or is receding directly therefrom. Movement of the tracer arm 20 either toward or away from the contact edge of the template 17 from a neutral or normal position results in a decrease in speed of travel of the tool 10 in a longitudinal direction from its normal speed of travel and irrespective as to whether the tool is advancing toward the axis of the work piece or is receding from the axis.

After complete travel of the tool has been accomplished from right to left, then a rapid return of the tool to the right may be accomplished by moving the switching valves 39, 40 to the position shown in Fig. 3 wherein the connections to the cylinder 14 are reversed and the variable restriction 30 is made non-effective.

The system which I have just described in connection with Figs. 1, 2 and 3 is in general a two-element control wherein the lathe tool is positioned both transversely and longitudinally of the work piece. It will, of course, be seen that either element may be employed without necessarily employing the second element. For example, a lathe or similar material forming machine may have the tracer assembly 19 control only the cross feed of the tool or only the longitudinal speed of the tool, or the two combined as I have just described. It may, however, in certain instances be desirable to include a third element, namely, a control of the speed of rotation of the work piece 16, so that the linear cutting speed of the tool will remain constant regardless of the diameter of the work piece at which the tool is cutting. In other words, so that the speed of rotation of the work piece 16 will be different when the tool 10 is cutting at a larger diameter than it is when the tool is cutting at a smaller diameter. To illustrate such a possibility I have indicated on Fig. 1 an oil motor 46 for rotating the work piece 16 and under the control of a tracer assembly 19A which may be mounted on and longitudinally moved with the carriage 7. On the cross-slide 8 I locate a cam surface 47 movable with the tool 10 and relative to the tracer arm 20A of the tracer assembly 19A so that the tracer arm 20A is deflected by the cam 47 an amount indicative of the transverse position of the tool 10 relative to the axis of the work piece 16.

As explained in connection with Fig. 2, the tracer assembly 19A may control a variable fluid restriction 30A in the supply line 48 leading from the pump 31 to the motor 46, or in the discharge line 49 between the motor 46 and the sump 33, so that the speed of the motor 46 will depend entirely upon the position of the tracer arm 20A relative to the assembly 19A, and consequently will depend upon the transverse location of the cutting tool 10. The tracer assembly 19A is connected to the air header 24 through a branch 50 and applies a regulated air pressure to the bellows 51 of the fluid restriction assembly 30A, such pressure bearing a definite relation to the transverse position of the tool 10 relative the axis of the work piece 16.

In other words, as the diameter at which the tool 10 is cutting increases or decreases, the speed of rotation of the work piece 16 will correspondingly decrease or increase respectively. It will be apparent that this third element of control may be included on the lathe of Figs. 1, 2 and 3, either alone or in combination with either or both of the two elements of transverse and longitudinal tool travel.

The tracer assembly 19 is described in detail in the above referred-to Barnes Patent 2,486,097.

With the arrangement so far described there are three basic conditions of operation, viz.

1. For cylindrical turning where the profile of the template 17 is a straight line parallel to the axis of the work piece 16. Upon air pressure being available at the pipe 25, and correspondingly within the bellows 27 and 29, the piston 12 (Figs. 1 and 2) moves toward the top of the drawing carrying the tool 10 into engagement with the work piece and causes the tracer arm 20 to engage the edge of the template 17 and deflect. This permits a predetermined bleed of air to the atmosphere and a predetermined pressure of air imposed within the bellows 27 and 29. At this predetermined air pressure the pilot valve assembly 28 is so positioned as to lock oil in the pipes 35, 36 to opposite ends of the piston 12 and prevent the tool 10 from further advancing toward or receding from the axis of the work piece 16. At the same time the air pressure imposed upon the bellows 29 causes a predetermined normal flow of oil through the pipe 42, the valve 40, the valve 39, the pipe 44, the resistance 30 and the pipe 45 to the sump 33, resulting in a normal uniform rate of travel of the piston rod 15 from right to left, and correspondingly a normal uniform rate of travel of the tool 10 from right to left along the work piece 16. The result is a cylindrical turning of the work piece 16.

2. Assume that the profile of the template 17 recedes from parallelism with the axis of the work piece 16. The deflection toward the left of the tracer arm 20 is eased, the valve assembly tends to move toward the left, and pressure within the pipe 25 tends to build up. Such increase in pressure effective upon the bellows 27 causes a flow of oil through the pipe 36 and a bleed of oil through the pipe 35, resulting in a movement of the piston rod 13 (upward in Fig. 1) such that the tracer arm 20 will tend to follow the receding profile of the template 17 and at the same time the tool 10 will move toward the axis of the work piece 16. If the recession of the template 17 is uniform, that is a straight line departing from the axis of the work piece 16, then the work piece will be formed to a taper of decreasing diameter toward the left. The increase in air pressure within the pipe 25 effective upon the bellows 29 causes the variable fluid resistance 30 to tend to throttle the discharge of oil from the left-hand end of the cylinder 14, and reduce the speed of longitudinal travel of the tool 10 toward the left.

3. If the profile of template 17 tends to approach the axis of the work piece 16 the reverse condition obtains, namely, that the tracer arm 20 tends to deflect in a greater degree toward the left, tending to decrease the air pressure within the pipe 25. Such decrease in air pressure effective upon the bellows 27 results in a movement of the piston rod 13 downward on the drawing (Fig. 1), resulting in the tool 10 producing an increasing diameter upon the work piece 16. At the same time the decrease in pressure within the pipe 25 effective upon the bellows 29 causes the variable fluid resistance 30 to throttle the discharge of oil from the lefthand end of cylinder 14, and thus reduce the longitudinal travel speed of the tool 10.

It will be observed that under condition 2 as well as under condition 3, namely, when the tool 10 is positioned either toward or away from the axis of the work piece 16, the rate of longitudinal travel of the tool is decreased. To carry this to an extreme, assume that the profile of the template 17 includes a shoulder normal with the axis of the work piece, the longitudinal travel of the tool 10 will cease, while the tool is approaching or receding from the axis of the work piece along a line normal thereto. For all degrees of taper or inclination relative to the axis of the work piece, a corresponding rate of longitudinal travel of the tool is obtained. Thus in cutting a step taper a different longitudinal speed is had than in cutting a slow taper.

The adjustable fluid resistance assembly 30 is illustrated in greater detail in Figs. 4–9 inclusive. Therein I have indicated by the same numerals those parts which are similar in the relay 28. The assembly 30 of Fig. 4 is shown as approximately one-half scale whereas Fig. 5 is approximately full scale, while Figs. 7, 8 and 9 are to further enlarged scale.

The adjustable fluid resistance comprises a movable member 110 positionable relative to a stationary sleeve 111. The two are confined in a fixed housing 112 joined by inlet pipe 44 and outlet pipe 45. Member 110 is provided with spaced lands 113, 114 having pressure equalizing grooves. In neutral position (as shown in Fig. 5) the lands are so spaced and located relative to access to the pipes 44, 45 that what may be considered a normal flow of oil exists from the pipe 44 to the pipe 45. The power system, including the spring 88 and bellows 29 may be so adjusted that the member 110 will be in its normal position for a given air loading pressure effective upon the bellows 29 which will be the neutral pressure for the relay valve Fig. 4. Any departure of such air pressure, either an increase or a decrease, resulting in movement of the member 110 upwardly or downwardly relative to the sleeve 111, will cause a decrease in rate of oil passage from the pipe 44 to the pipe 45. Thus any variation in air loading pressure upon the bellows 29 will result in a slowing down of the travel of the piston rod 15 from right to left as compared to its normal speed of travel. This is the same thing as saying that the longitudinal travel of the tool 10 will be decreased in speed upon any movement of the tracer arm 20 from neutral or normal position corresponding to a normal air pressure in the pipes 25 and 109.

In order that the value of what I term a normal rate of passage of oil from pipe 44 to pipe 45 may be basically changed, I provide means for angularly moving the member 110 to thereby increase or decrease the opening to oil flow between the pipes 44 and 45 when the member 110 is axially in its normal position. Such means includes a local or remote handle 115 adapted to cause rotation of spur gears 116, 117, the latter being loosely journaled on the body or fixed housing 112. Carried with the gear 117 is an arm 118 having a driving post 119. Angular movement of the driving post 119 around the axis of the assembly angularly positions the member 110 and ball joint 93 through the agency of a leaf spring or crank 120. The construction is such that the member 110 and leaf spring 120 may be moved axially without appreciable loading by the leaf spring.

In Fig. 6 I illustrate the possibility of angularly moving the sleeve 111A, through the agency of leaf spring 120, relative the axially movable member 110 and stationary housing 112.

Referring now to Fig. 7, it will be observed that the member 110 has a flatted portion 121 joining the lands 113, 114. Preferably the width of the rectangular cross-section portion 121 is less than the diameter of the lands 113, 114. Said lands 113, 114 are beveled toward the flatted portion 121 so that as the member 110 (in normal axial location) is angularly moved around its axis through the agency of the handle 115, a different portion of the bevel is presented opposite the exit from the pipe 44 and opposite the entrance to pipe 45. Thus in a given angular position of the member 110 any vertical positioning of the member is over a different range of fluid flow rate than for some other angular position.

In Figs. 8 and 9 I show a further preferred construction of the member 110 wherein that portion 122 joining the lands 113A, 114A is cylindrical and of a slightly less diameter than the diameter of the lands. At the facing ends of lands 113A, 114A the step constituting the difference in diameter between the portion 122 and diameter of the lands is formed as a spiral over 180° of the circumference, both spirals having similar angular orientation. As indicated in Fig. 9 this double spiral end of each land is milled to the depth of the diameter of the portion 122. With this preferred construction a more graded or gradual adjustment of the range of fluid passage in accordance with angular rotation of the member 110 is obtained. It will be apparent that the member 110 may assume other shapes to allow a greater or lesser latitude in adjustability of the range of fluid throttling, and thereby the range in speed of the piston rod 15.

While I have illustrated and described certain preferred embodiments of my invention it will be understood that they are by way of example only and that I am not to be limited thereto except as defined in the following claims.

What I claim as new, and desire to secure by Letters Patent of the United States, is:

1. In a hydraulic flow control valve, the combination comprising a housing, a sleeve member mounted to said housing and provided with longitudinally spaced fluid ports, a reciprocable fluid resistance stem member axially positioned within said sleeve member, said stem member being of generally cylindrical shape having lands spaced to cooperate with said ports, the portion of the stem member between said lands being reduced to form a central relatively thin rectangular cross-section the width of which is slightly less than the diameter of the lands, the said portion being joined to each land by a pair of beveled surfaces, angular movement of one of said members relative the other varying the presentation of the beveled surfaces to the ports, and means for angularly positioning the stem member relative to the sleeve member.

2. In a hydraulic flow control valve, the combination comprising a housing, a sleeve member mounted in said housing and provided with longitudinally spaced fluid ports, a reciprocable fluid resistance stem member axially positioned within said sleeve member, said stem member being of generally cylindrical shape having lands spaced to cooperate with said ports, the portion of the stem member between said lands being reduced to form a central relatively thin rectangular cross-section the width of which is slightly less than the diameter of the lands, the said portion being joined to each land by a pair of beveled surfaces, angular movement of one of said members relative the other varying the presentation of the beveled surfaces to the ports, and means for angularly positioning the sleeve member relative to the stem member.

3. In a hydraulic flow control valve, the combination comprising a housing, a sleeve member mounted in said housing and provided with longitudinally spaced fluid ports, a reciprocable fluid resistance stem member axially positioned within said sleeve member, said stem member being of solid generally cylindrical shape having lands spaced to cooperate with said ports, the portion of the stem member between said lands being cylindrical and of a slightly less diameter than said lands, the facing ends of said lands being formed as similarly oriented spirals extending over 180 degrees of the circumference, angular movement of one of said members relative the other varying the presentation of the end spirals to the ports, and means for angularly positioning one of said members relative to the other.

4. In a hydraulic flow control valve, the combination comprising a housing, a sleeve member mounted in said housing and provided with longitudinally spaced fluid ports, a reciprocable fluid resistance stem member axially positioned within said sleeve member, said stem member being of generally cylindrical shape having lands spaced to cooperate with said ports, the portion of the stem member between said lands being of reduced cross-section with the adjacent ends of said lands formed with oppositely disposed receding surfaces for varying the flow range controlled by axial positioning movement of the stem member, supporting means including a ball joint secured to one end of said stem member, a leaf spring fixedly secured as a crank to the other end of said stem member, and means connected to an outer part of said leaf spring and said housing for angularly positioning said stem member relative to said sleeve member.

5. In a hydraulic flow control valve, the combination comprising a housing, a sleeve member mounted in said housing and provided with longitudinally spaced fluid ports, a reciprocable fluid resistance stem member axially positioned within said sleeve member, said stem member being of generally cylindrical shape having lands spaced to cooperate with said ports, the portion of the stem member between said lands being reduced to form a central relatively thin rectangular cross-section the width of which is slightly less than the diameter of the lands, the said portion being joined to each land by a pair of beveled surfaces, angular movement of one of said members relative the other varying the presentation of the beveled surface to the ports, supporting means including a ball joint secured to one end of said stem member, a leaf spring fixedly secured as a crank to the other end of said stem member, and means including gearing for driving an arm connected to an outer part of said leaf spring for angularly positioning said stem member relative to said sleeve member.

CLARENCE JOHNSON.

REFERENCES CITED

The following references are of record in the file of this patent:

UNITED STATES PATENTS

| Number | Name | Date |
|---|---|---|
| 26,654 | Cridge | Jan. 3, 1860 |
| 685,510 | Flint | Oct. 29, 1901 |
| 701,574 | King | June 3, 1902 |
| 2,059,363 | Kimball | Nov. 3, 1936 |
| 2,141,428 | Carroll | Dec. 27, 1938 |
| 2,158,737 | Wunsch | May 16, 1939 |
| 2,311,108 | Hauser | Feb. 16, 1943 |

FOREIGN PATENTS

| Number | Country | Date |
|---|---|---|
| 113,405 | Sweden | of 1945 |